United States Patent
Ray et al.

(10) Patent No.: US 6,587,455 B1
(45) Date of Patent: Jul. 1, 2003

(54) AUTOMATIC DISCOVERY OF NODES ASSOCIATED WITH A VIRTUAL SUBNET

(75) Inventors: Dipankar Ray, Plano, TX (US); Rene Gallant, Plano, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/320,957

(22) Filed: May 27, 1999

(51) Int. Cl.[7] .............................. H04J 3/24; G06F 15/16
(52) U.S. Cl. ..................... 370/352; 370/475; 709/227; 709/238
(58) Field of Search ................................. 370/252, 352, 370/475, 354, 397; 709/223, 238, 245, 224, 225, 226, 227, 228, 229, 220

(56) References Cited

U.S. PATENT DOCUMENTS

| | | | | |
|---|---|---|---|---|
| 5,835,723 A | * | 11/1998 | Andrews et al. | 370/252 |
| 6,085,238 A | * | 7/2000 | Yuasa et al. | 370/409 |
| 6,243,749 B1 | * | 6/2001 | Sitaraman et al. | 709/220 |
| 6,374,295 B2 | * | 4/2002 | Farrow et al. | 709/223 |
| 6,405,253 B1 | * | 6/2002 | Schutte et al. | 370/397 |
| 6,442,158 B1 | * | 8/2002 | Beser | 370/352 |

FOREIGN PATENT DOCUMENTS

WO    WO 97/48210    12/1997

OTHER PUBLICATIONS

Droms, R.; Dynamic Host Configuration Protocol: Bucknell University; Oct. 1993.

* cited by examiner

*Primary Examiner*—Hassan Kizou
*Assistant Examiner*—Afsar M. Qureshi

(57) ABSTRACT

A method, apparatus, and system for dynamic allocation of a network address associated with a virtual subnet (302) to a network device (100) having a transceiver (102) coupled to a network (304) for broadcasting an address server query message (602) in response to initialization of the network device (100) and an address server (200) coupled to the network (304) sending the network address associated with a virtual subnet (302) to the network device (100) in response to the address server (200) receiving the address server query message (602).

25 Claims, 8 Drawing Sheets

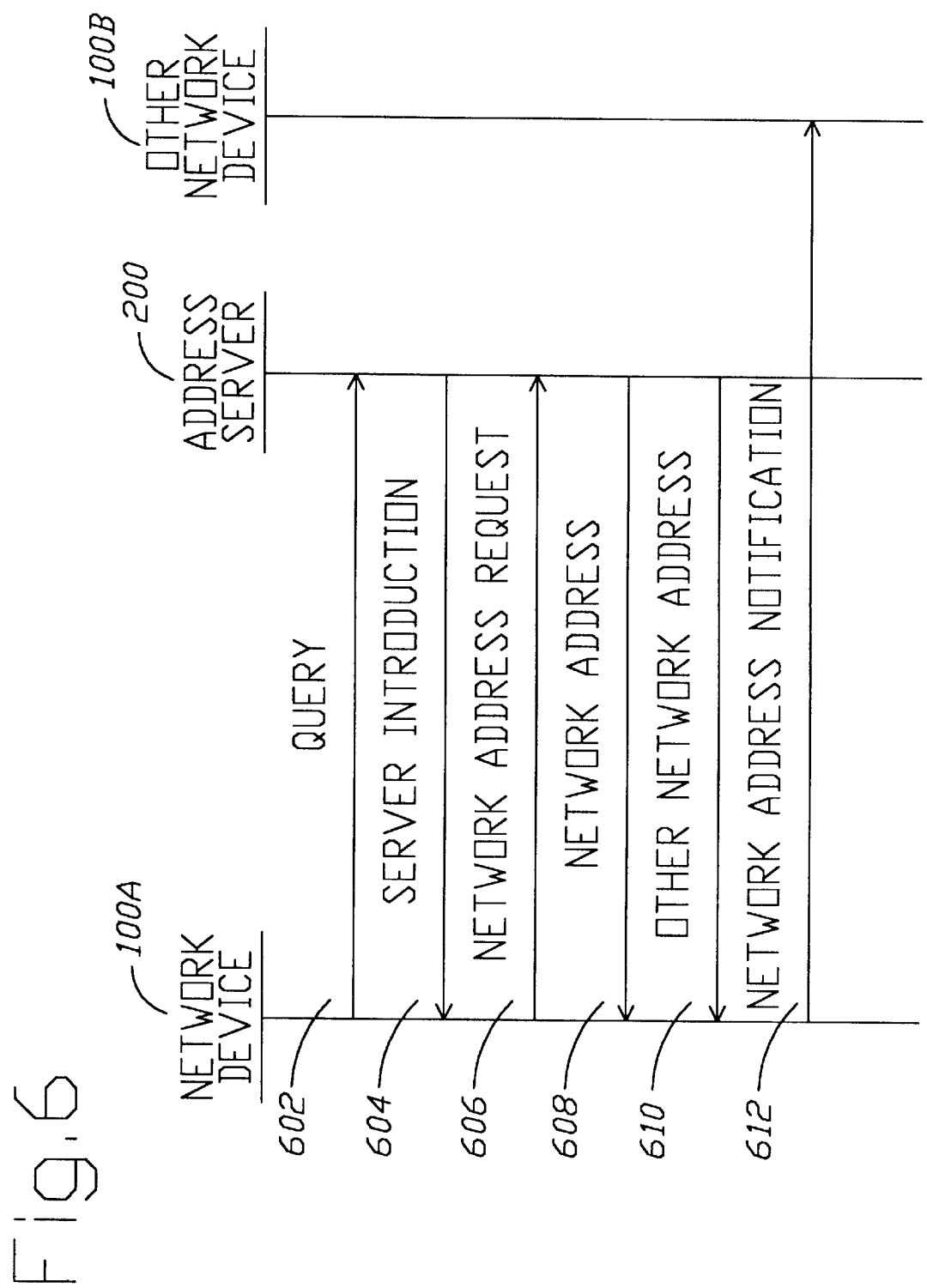

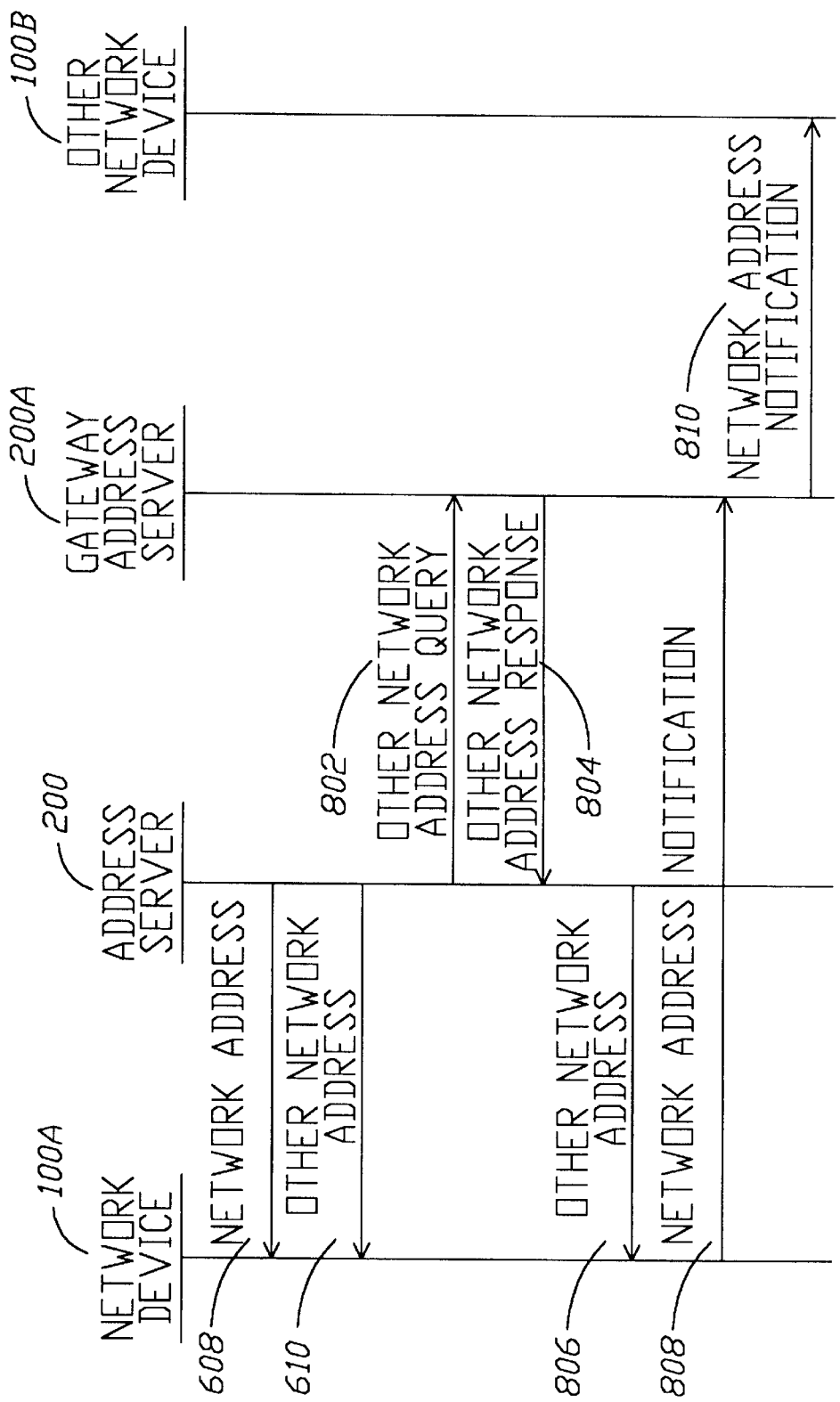

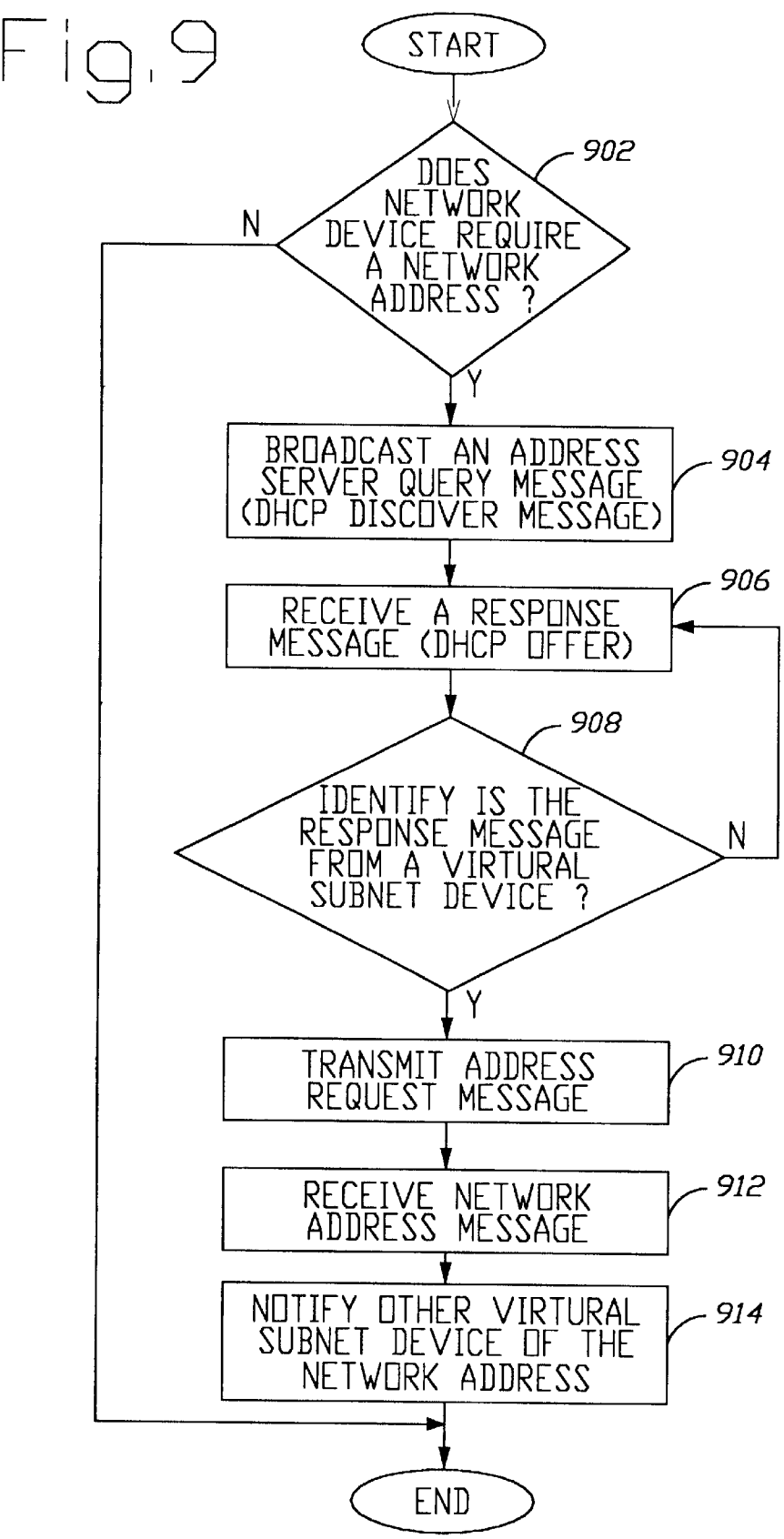

AUTOMATIC DISCOVERY OF NODES ASSOCIATED WITH A VIRTUAL SUBNET

TECHNICAL FIELD

The present invention relates generally to automatic network address assignment and, in particular, to dynamic address assignment in a virtual sub-network.

BACKGROUND

New network devices that are added to an Internet Protocol (IP) network need to have an IP address. An IP address (also called an IP number) is a numeric sequence which uniquely identifies a computer in the IP network. An IP address is analogous to a telephone number in that the telephone number is used by telephone network devices to direct calls to a specific location. The IP address is used by IP network devices to direct data to another network device. Originally, network administrators had to assign and configure every network device with a unique IP address, often a time consuming task. The IP addressing capabilities of the IP specification was enhanced with the creation of the Bootstrap Protocol (BOOTP).

BOOTP is a protocol that allows a network device, such as a computer workstation, to automatically receive an IP address from a server host and have a network device initialize without user involvement. The BOOTP allows the network device to discover its own IP address, the address of the address server, and the name of a boot file to be executed by the network device. The network administrator configuring BOOTP was still required to initially assign an IP address to the network device at the address server in order for the network device to discover its assigned IP address when booting. Therefore, the network device has a statically assigned network address when using BOOTP.

An advancement over BOOTP for IP address allocation is called Dynamic Host Configuration Protocol (DHCP). DHCP allows a network device to request an IP address from a pool of addresses for a predetermined amount time (referred to as a lease). The pooling and leasing of IP addresses allows IP networks configured for DHCP to support more network devices than physical IP addresses. If a network device moves within the IP network supported by a DHCP server, no additional IP network administration activity is required. The IP address is dynamically assigned to the network device from a pool of IP addresses maintained by the DHCP server, unlike the static network address assignment of BOOTP. Thus, DHCP allows network devices to locate the address of a server managing a pool of IP addresses from which IP addresses are assigned dynamically.

DHCP is limited to identifying the IP address of an address server and an individual network device. In a virtual sub-network (subnet), every network device belonging to the subnet needs to know of every other device belonging to that virtual subnet. Accordingly, there is a need in the art for a network device to automatically receive an IP address from a pool of IP addresses that are associated with a virtual subnet and also for the network device to be notified of the other network devices associated with the virtual subnet. Additionally, a need exists to allow dynamic allocation of IP addresses to network devices when the virtual subnet exist on both sides of a firewall.

SUMMARY OF THE INVENTION

The present invention is directed to a system and method for a network device to receive a network address and the network address of other devices in a virtual IP subnet.

When a network device initially connects to a network the device seeks an address server from which to request a network address. The protocol is implemented such that a network device is able to identify the address server for the virtual subnet. The network device then requests a network address that is associated with the virtual subnet from the pool of network addresses managed by the address server. The address server responds with a network address from a pool of network addresses and a list of other network addresses for the nodes associated with the virtual subnet. Additionally, the protocol is expanded to allow for the virtual subnet to exist on both sides of a network firewall.

BRIEF DESCRIPTION OF THE DRAWINGS

Other aspects of the invention including specific embodiments are understood by reference to the following detailed description taken in conjunction with the intended drawings in which:

FIG. 6 is an illustration of the message flow between a network device, address server, and other network device in accordance with the invention;

FIG. 8 is an illustration of message flow between a network device, an address server, a gateway address server, and another network device in accordance with the invention; and FIG. 9 is a flow chart of a method of a network device receiving an address from an address server in accordance with the invention.

DETAILED DESCRIPTION OF PREFERRED EMBODIMENT

Figure 1:
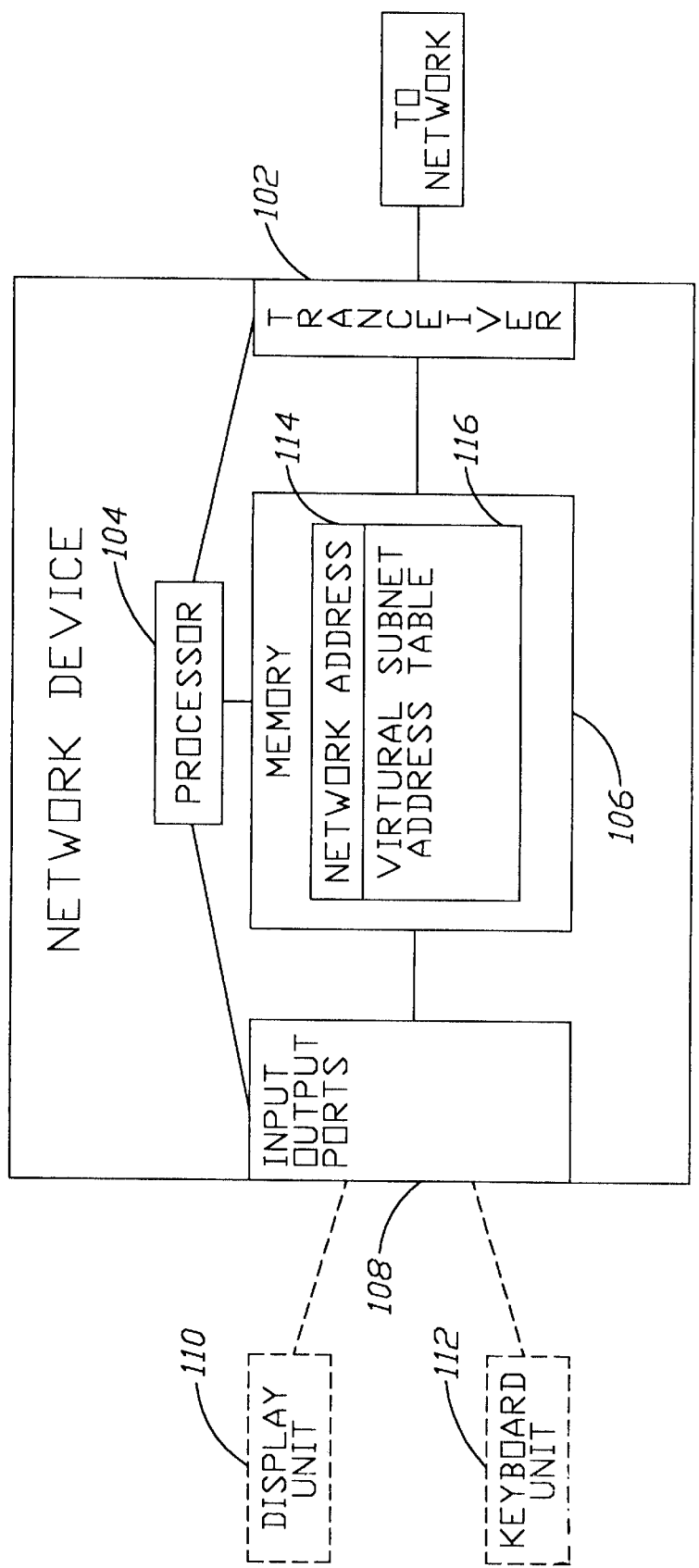
FIG. 1 is a block diagram of a network device in accordance with the invention.

Referring now to FIG. 1, a block diagram of a network device 100 in accordance with the invention is shown. The network device 100 has a transceiver 102 for connecting to a network. The transceiver 102 is connected to a processor 104 and a memory 106. The processor 104 is coupled to input/output ports 108 and the memory 106. The input/output ports 108 are optionally coupled to a display unit 110 and keyboard unit 112. Additionally, the memory 106 contains a network address memory location 114 for storing a network address and a virtual subnet address table 116 for storing other network addresses of other network devices.

The network device 100 is coupled to the network via a transceiver 102 controlled by the processor 104 through which data is transmitted and received. The processor 104 is a controller that may selectively be a microprocessor, application specific integrated circuit (ASIC), or even a state machine implemented with discrete logic devices. The processor 104 selectively transfers data to and from the transceiver 102 and the memory 106.

The memory 106 is a combination of read only memory and random access memory, however other types of storage devices, such as magnetic medium, EEPROMs, or optical storage medium, may be used. The memory 106 is divided into memory location for storing data. One such memory location is the memory location for the network address 114. Another set of related memory locations create a virtual subnet address table 116 for storing the network addresses of other network devices that belong to a virtual subnet as described in FIG. 3.

The input/output ports 108 allow information to be entered and transmitted to external units, such as the display unit 110 and the keyboard unit 112, which are optionally connected to the network device 100. Other types of network devices, such as network video cameras, have only a network connection and may be totally self-contained. If input/output ports 108 as shown in FIG. 1 are present, then the input/output ports 108 are controlled by the processor 104. The processor 104 transfers information between the memory 106 and the input/output ports 108.

Figure 2:
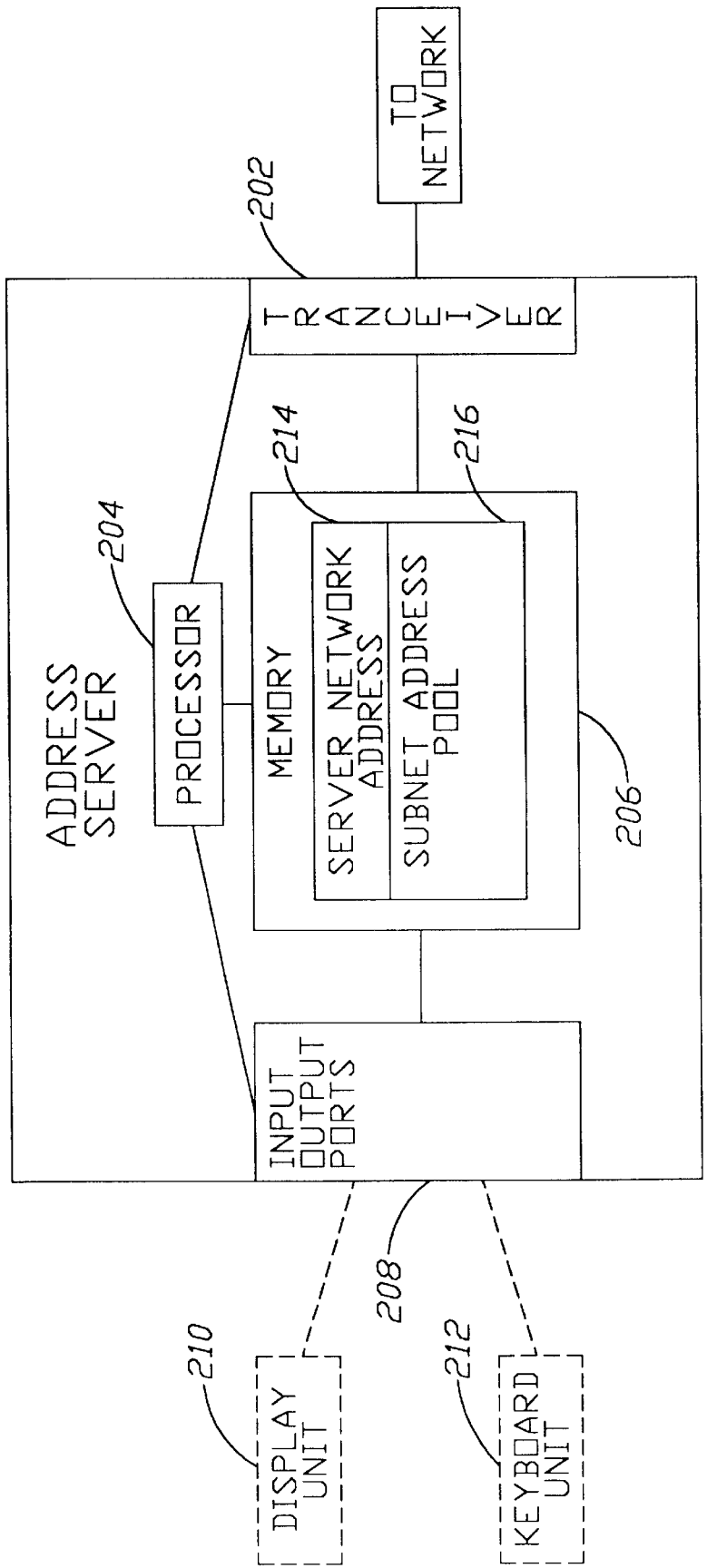
FIG. 2 is a block diagram of an address server device in accordance with the invention.

Turning to FIG. 2, a block diagram of an address server 200 is shown. The address server 200 has a transceiver 202 for connecting to the network. The transceiver 202 is coupled to a processor 204 and a memory 206. The processor 204 is coupled to input/output ports 208 and the memory 206. The input/output ports 208 are optionally coupled to a display unit 210 and keyboard unit 212. Additionally, the memory 206 contains a memory location for storing a server network address 214 and a subnet address pool 216 containing addresses for assignment to other network devices.

The address server 200 is coupled to a network via the transceiver 202 through which data is transmitted and received. The transceiver 202 is controlled by the processor 204. The processor 204 is a controller that can be a microprocessor, application specific integrated circuit (ASIC), or even a state machine implemented with discrete logic devices. The processor 204 selectively transfers data to and from the transceiver 202 and the memory 206.

The memory 206 in the preferred embodiment is a combination of read only memory and random access memory, but other types of storage devices, such as magnetic medium, EEPROMs, or optical storage medium, may be used as the memory 206. The memory 206 is divided into memory locations for storing data. One such memory location is the memory location for the server network address 214 assigned to the address server 200. Another set of related memory locations create a subnet address pool 216 for storing network addresses associated with the virtual subnet as described in FIG. 3.

The input/output ports 208 allow information to be entered and transmitted to external units, such as the display unit 210 and the keyboard 212, which are optionally connected to the address server 200. If the input/output ports 208 as shown in FIG. 2 are present, then the input/output ports 208 are controlled by the processor 204. The processor 204 transfers information between the memory 206 and the input/output ports 208.

The address server 200 monitors for a broadcast message from the network device 100, FIG. 1, seeking a network address. The address server 200, FIG. 2, then responds and if selected by the network device 100, FIG. 1, assigns the network address from the subnet address pool 216 of network address. An example of the address server is a DHCP server. The DHCP server responds to DHCP messages and assigns a network address to network devices in an IP network.

Figure 3:
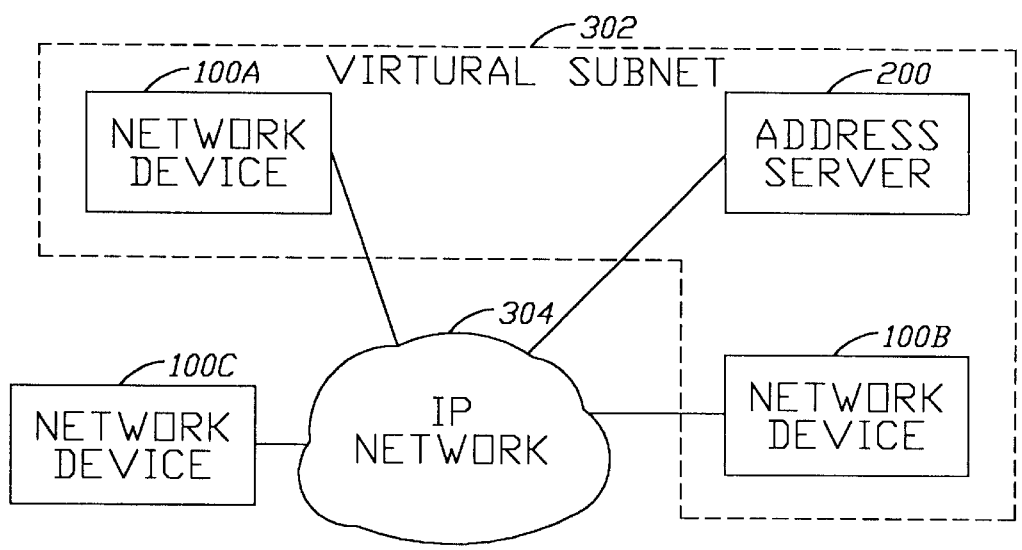
FIG. 3 illustrates a network having a virtual subnet in accordance with the invention.

FIG. 3 illustrates an IP network 304 having a virtual sub-network (subnet) 302 containing a network device 100A, address server 200, another network device 100B, and yet another network device 100C. The IP network 304 has connections to the network device 100A, the address server 200, and the other network devices 100B and 100C. The network device 100A, the address server 200, and the other network device 100B are also related by their respective IP address belonging to the virtual subnet 302. Network device 100C has a network address that does not belong to the virtual subnet 302 and is connected to the IP network 304.

Figure 4:
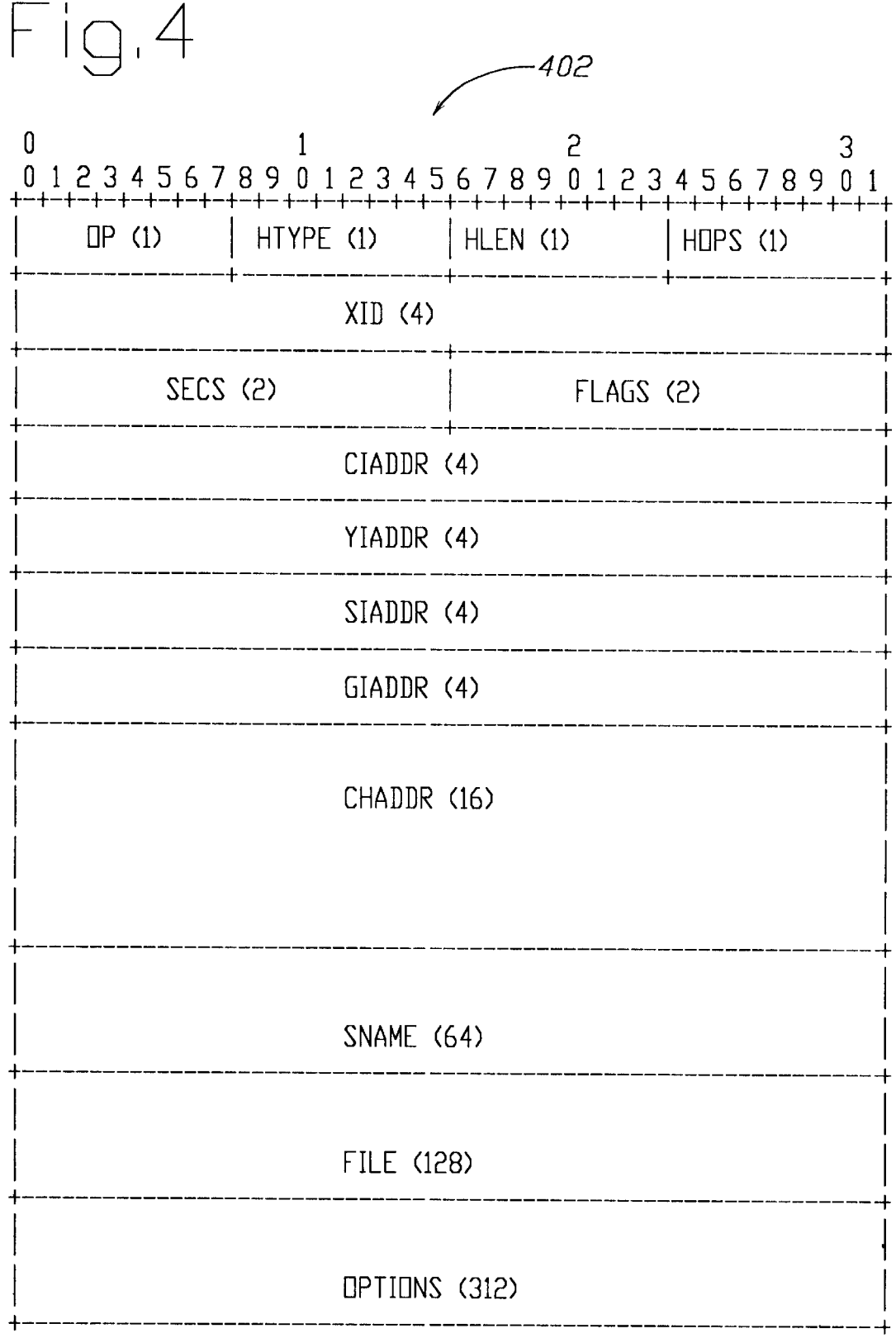
FIG. 4 is a diagram of a message format in accordance with the invention.

Turning to FIG. 4, a diagram of a message format for automatic discovery of nodes associated with a virtual subnet is shown. The message format for the present embodiment of the invention is from the Dynamic Host Configuration Protocol standard and specifically from the "Network Working Group, Request for Comments: 1541", released on October 1993. The fields as shown in FIG. 4 are defined as:

| FIELD | OCTETS | DESCRIPTION |
| --- | --- | --- |
| op | 1 | Message op code/message type.<br>1 = BOOTREQUEST,<br>2 = BOOTREPLY |
| htype | 1 | Hardware address type, see ARP section in "Assigned Numbers" RFC; e.g., '1' = 10 mb Ethernet. |
| hlen | 1 | Hardware address length (e.g. '6' for 10 mb Ethernet). |
| hops | 1 | Client sets to zero, optionally used by relay-agents when booting via a relay-agent |
| xid | 4 | Transaction ID, a random number chosen by the client, used by the client and server to associate messages and responses between a client and a server. |
| secs | 2 | Filled in by client, seconds elapsed since client started trying to boot. |
| flags | 2 | Flags (see FIG. 2). |
| ciaddr | 4 | Client IP address; filled in by client in DHCPREQUEST if verifying previously allocated configuration parameters. |
| yiaddr | 4 | 'your' (client) IP address. |
| siaddr | 4 | IP address of next server to use in bootstrap; returned in DHCPOFFER, DHCPACK and DHCPNAK by server. |
| giaddr | 4 | Relay agent IP address, used in booting via a relay-agent. |
| chaddr | 16 | Client hardware address. |
| sname | 64 | Optional server host name, null terminated string. |
| file | 128 | Boot file name, null terminated string; "generic" name or null in DHCPDISCOVER, fully qualified directory-path name in DHCPOFFER. |
| options | 312 | Optional parameters field. See the options documents for a list of defined options. |

Figure 5:
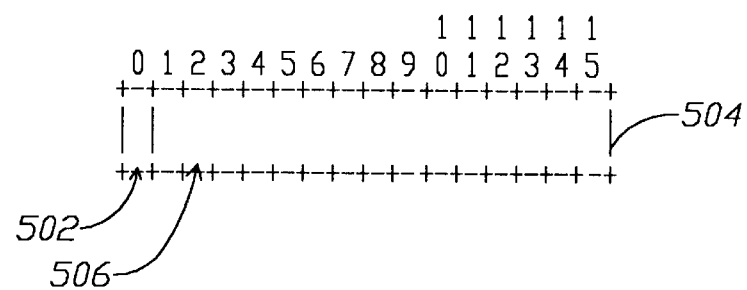
FIG. 5 is a diagram of the two octet flag field of the message format in accordance with the invention.

FIG. 5 is a diagram of the two octet flag field 402, FIG. 4 the first bit 502, FIG. 5, reserved for a broadcast flag. The other fifteen positions 1–15 504 are not defined in the DHCP specification. Preferably, a bit is chosen, such as bit two, 506 to identify a DHCP message as belonging to a virtual subnet device.

FIG. 6 is an illustration of the message flow between a network device, address server, and other network device. When a device is initially added to the IP network, such as the network device 100A, the device does not have a network address. The network device 100A sends or broadcasts a query message 602 to all devices on the network. The query message 602 is broadcast with the expectation of identifying address servers present in the IP network. The address server 200 receives the query message 602 and responds with a server introduction message 604. The network device 100A receives the response message and proceeds to process it. The processor 104, FIG. 1, in network device 100A determines if the sever introduction message 604, FIG. 6, is from an address server associated with the virtual subnet 302, FIG. 3. The determination is made by examining the flag field 402, FIG. 4, in the received message for a bit set in flag field two 506, FIG. 5.

If the server introduction message 604, FIG. 6, is determined by the processor 104, FIG. 1, to be from an address server 200, FIG. 6, belonging to the virtual subnet 302, FIG. 3, the network device 100A, FIG. 6, then formats and sends a network address request message 606 to the address server 200. The address server 200 receives the message and identifies the message as being from a network device seeking an IP address. The address server 200 also checks the flag field 506, FIG. 5, of the received network address request message 606, FIG. 6, to determine if a virtual subnet address should be assigned to the requesting network device 100A. Because the bit was set in the network address request message flag field, the address server 200 assigns an address to the network device 100A from the subnet address pool 216, FIG. 2. The address is then sent to the network device 100A, FIG. 6, from the address server 200 in the network address message 608.

The network device 100A receives the assigned network address and stores the address in the network address location 114, FIG. 1, in memory 106. The network device 100A is then able to receive messages from other devices connected to the IP network 304, FIG. 3. The other devices connected to the IP network 304 need to learn of the address assigned to the network device 100A, FIG. 6.

The network device 100A receives the other network addresses from the address server 200 in an "other network address" message 610. An options field as defined in the DHCP specification is used to carry the address data. An options field can be of a variable length up to 312 octets long. The options field may selectively be formatted with an option code, length of the message, and multiple pairs of node identifier followed by an IP address. For example:

| code | length | data |
|------|--------|------|
| xxx  | yyy    | 1 30.120.120.147, 2 125.23.34.120 . . . | where xxx is the code identifying the type of options field and yyy is the length of the options field and depends on the number of addresses contained in the options field. Additionally, in an alternative embodiment, the other network addresses may be included in an options field of the network address message.

Upon receiving the other network address message 610, the network device 100A stores the address in the subnet address table 116, FIG. 1, in memory 106. The network device 100A, FIG. 6, then sends a network address notification message 612 to the other devices whose addresses are stored in the subnet address pool 116, FIG. 1. For example, network device 110A, FIG. 6, may selectively notify network device 100B of its network address by sending a network address message 612 to the other network device 100B. Upon receiving the network address notification 612, the other network device 100B stores the received network address into memory. Therefore network devices belonging to the virtual subnet are dynamically assigned network addresses from the address server 200 and automatically update other network devices 100B with their assigned network address. Alternatively, the address server 200 may selectively notify the other network device 100B of the network address assigned to the network device 100A.

Figure 7:
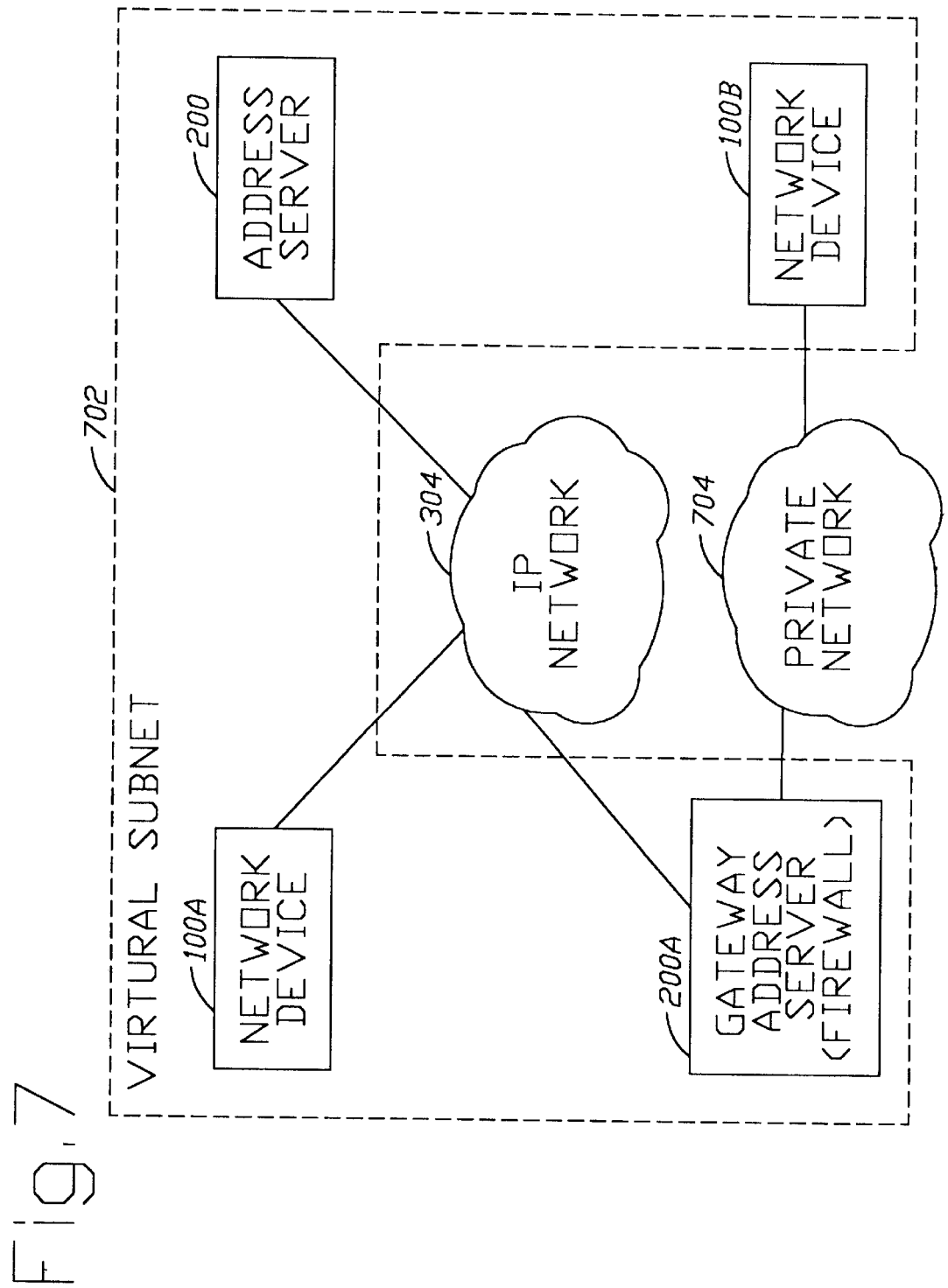
FIG. 7 illustrates a network divided by a gateway address server into an IP network and a private network having a virtual subnet existing on both sides of the gateway address server in accordance with the invention.

FIG. 7 illustrates a network divided by a gateway address server 200A into an IP network 304 and a private network 704 having a virtual subnet 702 existing on both sides of the gateway address server 200A. A firewall is a combination of hardware and software that enforces a boundary between two or more networks, such as the IP network 304 and the private network 704. The gateway address server 200A is a firewall that divides the private network 704 from the IP network 304. In order for a virtual subnet to exist across both the private network 704 and IP network 304, a network device 100A must be able to learn of another network device 100B located on the other side of the firewall 200A.

The network device 100A is enabled to receive a network address from the address server 200 residing on the same side of the firewall 200A using the procedures and messages described above. Additionally, the other network device 100B residing in the private network 704 receives an address from the gateway address server 200A coupled to the private network. Information from the IP network 304 and the private network 704 is exchanged between the servers 200, 200A. A DHCPTRANSINF message is not defined by the DHCP specification and is defined in the present application as a message that uses the DHCP message format that is sent between servers allowing information to be shared across a firewall. Thus, the virtual network is able to exist on both sides of the network because data and network device addresses can be transferred using the DHCPTRANSINF message between servers located in different networks.

FIG. 8 is an illustration of the additional message flow between the network device 100A, the address server 200, the gateway address server, and another network device 100B. The network device 100A is coupled to the IP network 304, FIG. 7, and receives the network address message 608 from the address server 200. The address server 200 then sends the other network addresses in the other network address message 610.

The address server 200 also sends an "other network address query" message 802, selectively the message may be the DHCPTRANSINF message to the gateway server 200A. The gateway server 200A determines that the message 802 belongs to a server associated with the virtual subnet 702 and responds back with the other network address response message 804. Selectively the other network address response message 804 may be the DHCPTRANSINF message containing the network address of the devices that belong to the virtual subnet 702 in the private network 704.

The address server 200 passes on the network address from the private network 704 to the network device 100A in another "other network address" message 806, FIG. 8. The network device 100A receives the "other network address" message 806 and stores the network address in the virtual subnet address table 116, FIG. 1, in memory 106. The network device 100A, FIG. 8, then notifies the other devices 100B and 200A of the network address that it has been assigned.

The network device 100A sends a network address notification message 808 to the gateway address server 200A.

The gateway address server 200A saves the network address of the sending network device 100A and sends a network address notification message 810 to the other network device 100B. The other network device 100B receives the network address for the network device 100A and stores the network address.

FIG. 9 is a flow chart of a method of a network device automatically receiving an address associated with a virtual subnet from an address server. Initialization of a network device is the state when the network device is powered on and connected to the network, but does not have a network address. Initialization is complete upon the network device 100A, FIG. 3, being able to communicate with the other network device 100B. For example the network device 100A is initialized by rebooting or upon initial power-up. In step 902, FIG. 9, the network device 100A, FIG. 3, determines if a network address is required. If the network device already has a network address, no further action is required.

If a network address is required, in step 904, FIG. 9, the network device 100A, FIG. 3, broadcasts an address server query message. If the network device 100A is coupled to an IP network, the broadcast message may selectively be a DHCPDISCOVER message having a bit set 506, FIG. 5, in the flag field 402, FIG. 4, signifying that the network device 100A, FIG. 3, is a member of the virtual subnet 302.

The network device 100A receives a response message, step 906, FIG. 9, from the address server 200, FIG. 3. In an IP network 304 the response message selectively may be a DHCPOFFER message. The processor 104, FIG. 1, in step 908, FIG. 9, identifies if the response message is from a virtual subnet device by examining the flag field 402, FIG. 4. If the response message was identified as not from a virtual subnet device in step 908, FIG. 9, then the network device 100A, FIG. 3, repeats step 906, FIG. 9. If the flag bit 506, FIG. 5, is set, then in step 910, FIG. 9, the network device 100A, FIG. 3, transmits an address request message to the address server 200 which is identified by the server network address received in the response message.

In step 912, the network device 100A, FIG. 3, receives a network address message containing a network address from the address server 200. The network device 100 stores the network address in the network address location 114 in memory 106. In step 914, FIG. 9, the network device 100A, FIG. 3, notifies the other devices that belong to the virtual subnet 302 of the network address that has been assigned by the address server 200. The network address is preferably contained in the data field of a message sent to the other network device 100B or the address may selectively be contained in a header field of the message.

An alternate method of notification has the address server 200, FIG. 3, notifying the other network device 100B of the network address assigned to network device 100A and then the other network device 100B sends a message to the network device 100A. The network device 100A then stores the other network address from the other network device 100B in the virtual network address table 116, FIG. 1.

While the invention has been described and shown with reference to preferred embodiments it should be understood by those skilled in the art that various other changes in the form and details may be made without departing from the spirit and scope of the invention.

What is claimed is:

1. A method of dynamic allocation of a network address to a network device from an address server associated with a virtual subnet comprising the steps of:

broadcasting an address server query message by the network device to the address server associated with the virtual subnet;

receiving at the network device from the address server the server network address identifying the address server associated with the virtual subnet; and transmitting an address request message to the address server identified by the server network address.

2. The method of dynamic allocation of claim 1 including the step of identifying, at the network device, a flag contained with the response message which indicates the address server is associated with the virtual subnet.

3. The method of dynamic allocation of claim 2 including the step of accepting another virtual subnet address for another network device.

4. The method of dynamic allocation of claim 3 in which the step of accepting further comprises the step of notifying the other network device of the network address assigned to the network device by the network device sending a message to the other network device.

5. The method of dynamic allocation of claim 4 in which the message from the network device to the other network device contains the network address of the network device in a data field.

6. The method of dynamic allocation of claim 3 in which the step of accepting further comprises the step of receiving, at the other network device, the network address for the network device in a message from the address server.

7. The method of dynamic allocation of claim 6 including the step of identifying at the network device that the response is a DHCPOFFER message from the address server that contains a flag indicating the address server is associated with the virtual subnet and contains a list of network addresses assigned to virtual subnet devices.

8. The method of dynamic allocation of claim 1 in which the step of broadcasting includes the step of sending a dynamic host configuration protocol (DHCP) DHCPDISCOVER message.

9. The method of dynamic allocation of claim 1 in which the network is an Internet Protocol network.

10. An apparatus for dynamic allocation of a network address to a network device from an address server associated with a virtual subnet comprising:

a transceiver located in the network device coupled to a network requesting the network address to be assigned to the network device by broadcasting an address server query message to the address server associated with the virtual subnet;

a memory located in the network device coupled to the transceiver for storing the server network address within a response message received by the transceiver from the address server associated with the virtual subnet;

a processor located at the network device coupled to the memory and the transceiver for identifying whether the server network address received within the response message is the server network address of the address server associated with the virtual subnet; and wherein the transceiver transmits an address request message to the address server in response to the processor identifying the server network address.

11. The apparatus of claim 10 in which the processor determines if a flag is contained with the response message which indicates the address server is associated with the virtual subnet.

12. The apparatus of claim 11 further comprising a virtual subnet address table in the memory for storing another address for another network device associated with the virtual subnet in response to the transceiver receiving the other network address.

13. The apparatus of claim 12 in which the transceiver notifies the other network device of the network address received from the address server by sending a message to the other network device associated with the other network address contained in the virtual subnet address table.

14. The apparatus of claim 13 in which a data field in the message contains the network address.

15. The apparatus of claim 10 in which the address server query message is a dynamic host configuration protocol (DHCP) DHCPDISCOVER message sent to a DHCP server.

16. The apparatus of claim 15 further comprises a DHCP DHCPOFFER message having a flag indicating the DHCP server is associated with the virtual subnet received by the transceiver in response to the transceiver broadcasting the DHCP DHCPDISCOVER message.

17. The apparatus of claim 10 in which the network is an Internet Protocol network.

18. A system for dynamic allocation of a network address in a network comprising:

a network device having a transceiver coupled to the network broadcasting an address server query message in response to initialization of the network device;

an address server having a server network address coupled to the network sending the server network address to the network device in response to the address server receiving the address server query message;

a memory located in the network device coupled to the transceiver for storing the server network address in response to the transceiver receiving the server network address;

wherein address server sending said server network address within a server introduction message; and a processor located in the network device coupled to the memory and the transceiver for determining if the address server is associated with the virtual subnet and transmitting a network address request message to the address server in response to receiving the server introduction message.

19. The system of claim 18 further comprising a flag in the server introduction message received at the network device from the address server to indicate the address server is associated with the virtual subnet.

20. The system of claim 18 further comprising a virtual subnet address table located in the memory of the network device for storing another network address of another network device associated with the virtual network in response to the address server sending the other network address.

21. The system of claim 20 further comprising a gateway address server in a private network associated with the virtual subnet coupled to the address server in the network sending the other network address from the gateway address server to the address server in response to the gateway address server receiving a request from the address server for the other network address of the other network device.

22. The system of claim 21 in which a DHCPTRANSINF message contains the other network address transmitted from the gateway address server to the address server.

23. The system of claim 21 in which an address update message having the network address of the network device is sent from the network device to the other network device via the gateway address server.

24. The system of claim 20 in which a data field in a message sent from the address server to the network device contains the other network address.

25. The system of claim 20 in which an address update message having the network address of the network device is sent from the network device to the other network device.

* * * * *